United States Patent [19]

Stover

[11] E Re. 31,363

[45] Reissued Aug. 30, 1983

[54] METHOD FOR REDUCING THE NITROGEN CONTENT OF SHALE OIL WITH A SELECTIVE SOLVENT COMPRISING AN ORGANIC ACID AND A MINERAL ACID

[75] Inventor: Carole S. Stover, Van Nuys, Calif.

[73] Assignee: Occidental Research Corporation, Irvine, Calif.

[21] Appl. No.: 233,734

[22] Filed: Feb. 12, 1981

Related U.S. Patent Documents

Reissue of:

[64] Patent No.: 4,209,385
Issued: Jun. 24, 1980
Appl. No.: 52,636
Filed: Jun. 27, 1979

[51] Int. Cl.[3] ..... C10G 17/04
[52] U.S. Cl. ..... 208/254 R
[58] Field of Search ..... 208/254 R

[56] References Cited

U.S. PATENT DOCUMENTS

| | | | |
|---|---|---|---|
| 3,595,776 | 7/1971 | Davidson et al. | 208/254 R |
| 3,719,587 | 3/1973 | Karchmer et al. | 208/254 R |
| 4,159,940 | 7/1979 | Smith | 208/254 R |

*Primary Examiner*—Delbert E. Gantz
*Assistant Examiner*—O. Chaudhuri
*Attorney, Agent, or Firm*—Christie, Parker & Hale

[57] ABSTRACT

A method is disclosed for reducing the nitrogen content of shale oil by selectivity removing therefrom nitrogen-containing compounds. The nitrogen content of shale oil is reduced by contacting the shale oil with a sufficient amount of a solvent which is selective toward the nitrogen-containing compounds present in the shale oil. The solvent is a mixture comprised of an organic acid and a mineral acid. The organic acid is selected from the group consisting of organic acids, and substituted organic acids, particularly acetic, formic and trichloroacetic acids and mixtures thereof; the mineral acid is selected from the group consisting of hydrochloric acid, nitric acid, nitrous acid, sulfuric acid, sulfurous acid, phosphoric acid and mixtures thereof.

15 Claims, No Drawings

METHOD FOR REDUCING THE NITROGEN CONTENT OF SHALE OIL WITH A SELECTIVE SOLVENT COMPRISING AN ORGANIC ACID AND A MINERAL ACID

Matter enclosed in heavy brackets [ ] appears in the original patent but forms no part of this reissue specification; matter printed in italics indicates the additions made by reissue.

BACKGROUND OF THE INVENTION

The method herein relates to reducing the total nitrogen content of shale oil by extracting nitrogen-containing compounds from the shale oil with solvent comprising a mixture of an organic acid and a mineral acid.

More particularly, this application relates to a method for reducing the nitrogen content of shale oil produced in either an above ground or an in situ oil shale retort.

The term "oil shale" as used in the industry is, in fact, a misnomer; it is neither shale nor does it contain oil. It is a sedimentary formation comprising marlstone deposits with layers containing an organic polymer called "kerogen" which, upon heating, decomposes to produce liquid and gaseous products. The formation containing kerogen is called "oil shale" herein and the liquid product produced upon decomposition of kerogen is called "shale oil".

Kerogen is considered to have been formed by the deposition of plant and animal remains in marine and nonmarine environments. Its formation is unique in nature. Alteration of this deposited material during subsequent geological periods produced a wide variety of organic materials. Source material and conditions of deposition were major factors influencing the type of final product formed.

Kerogen samples, found in various parts of the world, have nearly the same elemental composition. However, kerogen can consist of many different compounds having differing chemical structures. Some compounds found in kerogen have the structures of proteins while some have structures of terpenoids, and others have structures of asphalts and bitumens.

Shale oils produced from oil shale are generally high molecular weight, viscous organic liquids, of predominantly hydrocarbonaceous oxygen, nitrogen and sulfur or containing organic compounds. The shale oils are of varying linear, branched cyclic aromatic hydrocarbon and substituted hydrocarbon content with high pour points, moderate sulfur content and relativley high nitrogen content. As the composition of shale oil depends upon the composition of the kerogen within the oil shale formation, the composition of the shale oil can vary from one geographic location to another. The shale oil produced from an oil shale formation can vary also between strata within the oil shale formation. The nitrogen content of shale oil can also vary dependent upon the geographical location of the oil shale deposit from which the shale oil is produced. Such a variance in nitrogen content in different georgraphical locations can be attributed to differences in the environment during the time of the deposition of the organisms which, upon lithification, became oil shale. Such a variance can also be attributed to the different types of organisms in the separate geographical locations which were deposited to form the organic substance in the oil shale and any organisms within the formed deposited layer which acted upon such deposited material to provide the kerogen within the oil shale formation.

The nitrogen content in shale oil is attributable to basic nitrogen-containing compounds and nonbasic nitrogen-containing compounds. The relative percentages of the basic and nonbasic nitrogen compounds comprising the total nitrogen content of a shale oil can also vary depending upon the particular shale oil.

The nitrogen content of shale oil is generally up to about two percent by weight. The average nitrogen content of shale oil recovered by in situ retorting of oil shale from the Piceance Creek Basin of Western Colorado is on the order of about 1.4 percent by weight.

The presence of nitrogen in shale oil presents many problems in that the nitrogen can interfere with the transportation and use of the shale oil. Deleterious effects brought about by the presence of nitrogen in shale oil are decreased catalyst life in dehydrogenation, reforming, hydrocracking and catalytic cracking reactions, decreased chemical stability of products, and decreased color stability of products. Another problem with the presence of nitrogen in shale oil is that it is undesirable to transport nitrogen-containing shale oil through pipelines which are also used for transporting petroleum products of possible pollution of such products with residual nitrogen-containing shale oil in the pipeline. Generally such petroleum products contain a very low nitrogen content. The relatively high nitrogen content in the shale oil can pollute the pipelines making them undesirable and uneconomical for transporting such low nitrogen-containing petroleum products. In addition, high nitrogen content in shale oil can cause clogging of pipelines due to self-polymerization brought about by the reactivity of the nitrogen-containing compounds in shale oil. Some corrosion can occur thus damaging a pipeline used to transport shale oil.

Product stability is a problem that is common to many products derived from shale oil with the major exception of the asphalt cut and those products that have undergone extensive hydrotreating. Such instability, including photosensitivity, is believed to be resultant, primarily from the presence of nitrogen-containing compounds.

It is, therefore, desirable to reduce the nitrogen content of shale oil to increase the utility, transportability, and stability of the shale oil and the products derived from such shale oil.

Due to the undesirable nature of nitrogen in organic fluid streams, such as fluid streams produced in the recovery and refining of petroleum, coal and oil shale, many processes have been developed to reduce the nitrogen content to an acceptable level. The level of acceptability for the nitrogen content is generally based upon the use of the particular stream.

In U.S. Pat. No. 3,719,587 to Karchmer et al. a process is disclosed for removing basic nitrogen-containing compounds from coal naphtha. The basic nitrogen compounds are removed by washing the naphtha with water or with a dilute aqueous solution of a strong acid. The dilute acid solutions are disclosed as from 0 to 10 weight percent of the acid such as sulfuric acid, hydrochloric acid, phosphoric acid and acetic acid.

U.S. Pat. No. 2,848,375 to Gatsis discloses a process for removing basic nitrogen compounds from organic substances by washing with a weak acid in combination with a polyalcohol. The weak acid used is boric acid in combination with a polyhydroxy organic compound which has hydroxyl groups on adjacent carbons.

U.S. Pat. No. 2,741,578 to McKinnis teaches that mineral oils can be treated to recover the nitrogen bases by extracting the mineral oils with a selective solvent for the nitrogen bases. The selective solvents are organic hydroxy compounds. Organic hydroxy compounds which can be used are the compounds which have a pH greater than 6.5.

U.S. Pat. No. 2,035,583 to Bailey discloses a process for the separation and recovery of nitrogen bases from mineral oils. In the process, the mineral oil is extracted with a solvent for the nitrogen bases. Acceptable solvents are liquid sulfur dioxide, furfural, aniline, nitrobenzene and isobutyl alcohol. However, due to the solubility of desirable mineral oils, such as aromatics and olefines, the process also includes extracting the resultant extract with dilute aqueous acids to recover the nitrogen bases from the first extract. The nitrogen bases are then recovered from the aqueous solution by adding an inorganic base to precipitate the nitrogen bases.

U.S. Pat. No. 2,035,102 to Stratford et al. discloses a process for improving the color and viscosity of petroleum oils. In the process an oil is extracted with a selective solvent in combination with an acid. The selective solvent can be phenol, nitrobenzene, furfural or liquid sulfur dioxide. The acid is preferably an inorganic acid but can also be an organic acid such as picric, acetic, oxalic, citric and benzene sulfuric acids.

U.S. Pat. No. 2,541,458 to Berg discloses a process for recovery of nitrogen bases from hydrocarbon fractions. In the process the fraction is extracted with a volatile acid or nonvolatile acid salt in combination with a mutual solvent for the acid and the hydrocarbon fraction. The mutual solvents include low boiling alcohols and ketones. The extraction is conducted in the presence of water to avoid loss of the volatile acids.

U.S. Pat. No. 2,309,324 to McAllister et al. discloses a method for removing nitrogen bases from water-insoluble organic solvents, mineral oils and hydrocarbon fractions. In the process the mineral oil is extracted with an aqueous, weak acid solution. The weak acids are classified as acids having dissociation constants below $10^{-3}$. The aqueous acid solutions are prepared by dissolving from 15 to 90 weight percent of an acid in water. Upon extraction of the oil, two phases are formed. The aqueous phase contains the acid and absorbed nitrogen bases. The other phase consists of the organic substance from which at least a portion of the nitrogen bases has been removed.

Many of the processes described in the above processes do not address themselves to the removal of nonbasic nitrogen compounds which can be present in organic fluids. Additionally, many of the above described processes are not specific for treatmet of shale oil and the relatively high nitrogen content found in shale oil. Still further, none of the above processes are specific for lowering the nitrogen content for shale oil produced by in situ retorting of oil shale.

SUMMARY OF THE INVENTIONS

The present invention is directed to a method for the refining of shale oil wherein the nitrogen content of the shale oil is reduced by extracting nitrogen-containing compounds from the shale oil with a solvent system comprising a mixture of an organic acid and a mineral acid. The organic acid can be selected from formic acid, acetic acid and trichloroacetic acid; the mineral acid can be selected from hydrochloric acid, nitric acid, nitrous acid, sulfuric acid, sulfurous acid and phosphoric acid. In the preferred embodiment the acids comprising the solvent are concentrated, i.e., mixed with less than fifty percent water by weight. In the most preferred embodiment water is present only up to about fifteen percent by weight.

Shale oil produced by the retorting of oil shale is a liquid product which predominantly contains liquid hydrocarbons and some substituted liquid hydrocarbons such as nitrogen substituted hydrocarbons. A solvent which selectively substantially dissolves the nitrogen-containing compounds present in shale oil is added to the shale oil in an amount sufficient to dissolve such nitrogen-containing compounds. The amount of selective solvent system that is sufficient depends upon the solubility of such nitrogen-containing compounds in the extractant and amount of such nitrogen-containing compounds in the shale oil. The selective solvent system can also dissolve or otherwise retain some of the non-nitrogen-containing compounds present in shale oil. For this reason, during an extraction of the shale oil with a selective solvent some desirable compounds can be lost in the extractant. Therefore, the amount of selective solvent system used is also determined by balancing nitrogen extraction capabilities of the selective solvent against the amount of non-nitrogen-containing compounds also extracted. Selective solvent systems which are useful in extracting the nitrogen-containing compounds comprise a mixture of an organic acid selected from the group consisting of formic acid, acetic acid and trichloroacetic acid and mixtures thereof and a mineral acid selected from the group consisting of hydrochloric acid, nitric acid, nitrous acid, sulfuric acid, sulfurous acid, phosphoric acid and mixtures thereof. The mole ratio of the organic acid to the mineral acid is from about [1:5 to about 1:60, preferably from about 1:15 to about 1:40] *60:1 to about 5:1 preferably from about 40:1 to about 15:1.*

In the preferred embodiments both the organic acid and the mineral acid are concentrated, i.e., the solvent will contain less than about fifty percent water, by weight. Such selective solvent systems do not dissolve or otherwise remove the liquid hydrocarbons present in the shale oil to any appreciable extent. Further, such selective solvent systems are sufficiently insoluble in shale oil that a multiple layer system is provided when mixed with shale oil. Layer separation provides a separation of nitrogen-containing compounds from shale oil.

DETAILED DESCRIPTION OF THE INVENTION

This invention relates to the refining of shale oil and, more particularly, to the reducing of nitrogen content of shale oil.

As used herein, the term "crude shale oil" refers to the liquid product that is recovered from retorting of oil shale. The term encompasses liquid products formed during the retorting of oil shale either through above-ground retorting processes or in situ oil shale retorting processes which products have not undergone any further processing other than water removal or emulsion breaking. The term "processed shale oil" is used herein to indicate a crude shale oil which has undergone some processing, such as, for example, sulfur removal, fractionation, and the like. As used herein, the term "refined shale oil" refers to a crude shale oil or a processed shale oil which has been processed through the method of this invention to reduce the nitrogen content of such shale oil. The "refined shale oil," therefore, has a lower nitrogen content than the crude shale oil or processed shale oil undergoing the method herein disclosed.

In a preferred practice of this method, the method is utilized for refining shale oil produced from in situ retorting of oil shale. An in situ oil shale retort can be formed by many methods, such as those disclosed in U.S. Pat. Nos. 3,661,423; 4,043,595; 4,043,596; 4,043,597; and 4,043,598, all of which are incorporated herein by this reference.

In preparing an in situ oil shale retort, formation from within the boundaries of a retort site is excavated to form at least one void, leaving a remaining portion of unfragmented formation within the boundaries of the retort being formed. The remaining portion of unfragmented formation is explosively expanded toward such a void to form a fragmented permeable mass of formation particles containing oil shale within the retort boundaries.

After the fragmented mass is formed, the final preparation steps for producing liquid and gaseous products are carried out. These steps include drilling a plurality of feed gas inlet passages downwardly to the fragmented mass so that an oxygen-supplying gas can be supplied to the fragmented mass during retorting operations. Alternatively, the upper ends of blasting holes used in forming the fragmented mass can be cleaned and used for introducing gas to the retort. The fragmented mass connects to a product removal drift at the lower end of the fragmented mass.

During retorting operations, formation particles at the top of the fragmented mass are ignited to establish a combustion zone. An oxygen-supplying gas, such as air, is introduced to the combustion zone through the inlet passages. The oxygen-supplying gas introduced to the fragmented mass maintains the combustion zone and advances it downwardly through the fragmented mass. Combustion gas produced in the combustion zone passes through the fragmented mass to establish a retorting zone on the advancing side of the combustion zone wherein kerogen in the fragmented mass is converted to liquid and gaseous products. As the retorting zones moves downwardly through the fragmented mass, liquid and gaseous products are released from the fragmented formation particles. A sump in a portion of a drift connected to the lower end of the fragmented mass collects liquid products produced during operation of the retort. Off gas is also withdrawn through such drift to above ground.

Although the process disclosed herein of reducing the nitrogen content of shale oil is primarily discussed in relation to shale oil produced from the in situ retorting of oil shale, the process can be practiced on shale oil produced by other methods of retorting. Many of these methods for shale oil production are described in Synthetic Fuels Data Handbook, compiled by Dr. Thomas A Hendrickson, and published by Cameron Engineers, Inc., Denver, Colo. For example, other processes for retorting oil shale include those known as the TOSCO, Paraho Direct, Paraho Indirect, N-T-U, and Bureau of Mines, Rock Springs, processes.

The TOSCO retorting process is described on pages 75 and 76 of the Synthetic Fuels Data Handbook and the U.S. patents mentioned therein, including U.S. Pat. No. 3,025,223. Generally speaking, this process involves preheating minus ½ inch oil shale to about 500° F. in a fluidized bed. Pyrolysis is completed in a rotating drum heated by ceramic balls which are separately heated in a ball-heating furnace.

The Paraho process is described at pages 62, 63, 84 and 85 of the Synthetic Fuels Data Handbook and the U.S. patents referred to therein. The Paraho process employs a vertical kiln through which ground oil shale moves downwardly as gas moves upwardly. Combustion air can be admitted into the bed of oil shale particles for direct heating of oil shale by combustion within the bed. This process is referred to as Paraho Direct. The kiln can also be arranged so that recycled gas can be heated externally, then injected into the bed of oil shale for indirect heating of the oil shale. Such a process is referred to as Paraho Indirect.

The N-T-U process is a batch process as described at page 59 of the Synthetic Fuels Data Handbook and the U.S. patents referred to therein. In the N-T-U process, a retort is filled with a batch of oil shale particles and ignited at the top. Combustion is supported by air injection and a combustion zone is passed downwardly through the stationary bed of shale. Recycled gas from the bottom of the retort is mixed with the combustion gas to modulate temperatures and provide some of the fuel requirement.

The Bureau of Mines, Rock Springs process is described in the Synthetic Fuels Data Handbook and also in Paper No. SPE-6067 prepared for the 51st Annual Technical Conference and Exhibition of the Society of Petroleum Engineers of AIME, held in New Orleans, October 3–6, 1976, by R. L. Wise, et al. Such a process is also described in U.S. Pat. No. 3,346,044, among others. Generally speaking, this process involves fracturing of an underground oil shale formation with the fractures propped open with sand. Injection and production wells are drilled into the formation. A combustion zone is moved from an injection well towards one or more production wells for retorting oil shale in the fractured formation.

Nitrogen is removed from shale oil in the method herein by mixing the shale oil with a selective system solvent which is selective to nitrogen-containing compounds present in the shale oil. Upon mixing the selective solvent system with the shale oil, nitrogen-containing compounds are extracted from the shale oil and are dissolved in or absorbed by the selective solvent. Selective solvents which are useful in extracting nitrogen-containing compounds from shale oil comprise a mixture of an organic acid and a mineral acid. Preferably the organic acid is selected from the group consisting of formic acid, acetic acid, trichloroacetic acid and mixtures thereof, and the mineral acid is selected from the group consisting of hydrochloric acid, nitric acid, nitrous acid, sulfurous acid, sulfuric acid, phosphoric acid and mixtures thereof.

The ratio of organic acid to mineral acid in the selective solvent is from about [1:5 to about 1:60, preferably from about 1:15 to about 1:40] *60:1 to about 5:1, preferably from about 40:1 to about 15:1.*

It is preferred, although not essential to the practice of the invention thgt the acids comprising the selective solvent be concentrated; as such, the selective solvent should contain less than about fifty percent water, preferably less than about fifteen percent water. Some water though, on the order of at least one percent, is necessary to make the selective solvent immiscible with the shale oil and to prevent any appreciable dissolving of the shale oil in the selective solvent. The amount of water should also be sufficient to prevent any appreciable loss of the selective solvent in the shale oil.

Removal of nitrogen compounds from shale oil with a concentrated organic acid is taught in co-pending application Ser. No. 52,637, the disclosure of which is incorporated herein by this reference. Since organic acids are relatively weak their ability to interact with the more non-basic nitrogen compounds is limited. The selective solvent of the present invention, with the addition of a strong acid makes a greater quantity of acidic protons available for ionization of the nitrogen compounds and, thus for extraction into the more polar solvent phase. That is, the selective solvent system of the present invention enhances removal of nitrogen-containing compounds from shale oil by combining the protonating effect of the mineral acid with the solubilizing effect of the organic acid.

The combination of a strong acid with the organic acid provides a greater quantity of acidic protons for ionizing the nitrogen-containing compounds thereby making such protonating nitrogen-containing compounds more susceptible for extraction into the polar solvent phase. Therefore, more nitrogen-containing compounds can be removed from shale oil by using a selective solvent system which is a mixture of an organic acid and a mineral acid than by using an organic acid alone.

Preferred organic acids are formic acid and/or acetic acid; preferred mineral acids are hydrochloric and/or phosphoric acid.

Extraction of the shale oil with the selective solvent can be performed in batch or continuous extraction processes using cocurrent or countercurrent extraction techniques. In liquid phase batch extracting there can be employed a series of multi-stage batch extractions to improve overall efficiency of the extraction and to optimize nitrogen-containing compound removal. Similarly, countercurrent extraction can also be conducted utilizing countercurrent extractors arranged in series to optimize the nitrogen-containing compound removal.

The amount of selective solvent system that is required for extracting nitrogen-containing compounds from shale oil depends upon the nitrogen content in the shale oil and the solubility of such nitrogen-containing compounds in the selective solvent. THe ratio of shale oil to selective solvent system can be from about 0.20 to about ten parts by weight shale oil to one part by weight selective solvent. Generally, a significant excess of the selective solvent system is utilized to insure the highest probability of encountering the nitrogen-containing compounds with the selective solvent and thereby solvation of the nitrogen-containing compounds with the selective solvent.

Along with nitrogen removal from the shale oil through extraction with the selective solvent system, there is some inherent loss of shale oil by the extraction procedure. For example, some of the shale oil is carried away in the extractant following the separation. The most efficient separation process is a process which removes the greatest amount of nitrogen-containing compounds with little accompanying shale oil loss. Separation efficiency can be determined by measuring the nitrogen concentration in the oil in the extract phase. The higher the nitrogen concentration in the extracted oil the more efficient is the process. Every time a nitrogen atom is removed from shale oil by the extraction process, the organic molecule on which that nitrogen is bonded must go with it. The maximum efficiency of the process is thereby limited by the molecular weight distribution of the nitrogen-bearing compounds in the shale oil and can be approached by preventing non-nitrogen compounds from dissolving in the selective solvent and by selectively dissolving smaller nitrogen-containing molecules. Nitrogen removal by extraction with the selective solvent system herein was found to be independent of the temperature at which the extraction process was conducted. The extraction process is conducted by combining the selective solvent extractant with either a crude or a processed shale oil. The selective solvent and shale oil are thoroughly intermixed to provide for rapid achievement of equilibrium. Such intermixing can be conducted, for example, by agitation in the batchwise and continuous extraction techniques or by the current flow in the counter-current extraction techniques.

Following the contact phase of the extraction process the selective solvent extractant is separated from the shale oil. The separation is possible due to the immiscibility of the selective solvent system and shale oil. The immiscibility of the selective solvent system and shale oil provides liquid-liquid phase formation whereupon one phase comprises substantially nitrogen-free shale oil and the other phase comprises substantially selective solvent and nitrogen-containing compounds. The two phases are separated by decanting, withdrawing the lower phase or by other conventional liquid-liquid separation techniques. To facilitate complete separation of the two phases of the mixture an emulsion breaker can be added to the mixture.

The nitrogen content of shale oil can be lowered by conducting successive extractions of the shale oil with selective solvent system. Successive extractions can be conducted in the batchwise operation by separating the shale oil raffinate from the selective solvent pregnant with nitrogen-containing compounds after an initial extraction. The shale oil raffinate can then be extracted with fresh selective solvent system. Such successive extractions can be continued until the nitrogen content in the raffinate shale oil has been lowered to the desired level. Successive extractions can be conducted in countercurrent operation by transferring the shale oil raffinate effluent from one countercurrent extraction column into a second countercurrent extraction column against a flow of fresh selective solvent system.

After the pregnant selective solvent phase is separated from the shale oil raffinate having a reduced nitrogen content, the selective solvent can be recovered. The selective solvent is recovered by separating the nitrogen-containing compounds from the selective solvent. For example, some of the nitrogen-containing compounds that are basic can be precipitated from the selective solvent by adding a stronger base or the nitrogen-containing compounds can be extracted from the selective solvent in another extraction process. In another method the selective solvent can be volatilized and recovered to separate it from the nitrogen-containing compounds. The selective solvent so recovered can be recycled for use in subsequent extracting steps to reduce the nitrogen content of the other shale oils.

The extracted oil can also be useful because of its high nitrogen content. For example, the extracted oil can be used in the production of nitrogen compounds and various chemical intermediates containing nitrogen. When the selective solvent is volatilized, the residue can be used as an asphalt which provides good adhesive properties because of its nitrogen content and capabilities to cross-link through such nitrogen present.

The following examples illustrate the method herein described for reducing the nitrogen content of shale oil.

EXAMPLE 1-3

In the examples 1-3, extractions were made using concentrations of both formic acid and acetic acid. The shale oil was brought into contact with an aqueous solution of either formic or acetic acid. The two phases were agitated thoroughly to provide a high probability of the nitrogen-containing compounds in the shale oil encountering the formic acid or acetic acid.

Complete separation of the two phases formed was brought about by centrifuging the mixtures. An emulsion breaker was added when needed. Following separation, the phases were both analyzed for nitrogen, water, and organic acid content. Second and third stage extractions were carried out by contacting the raffinates (shale oil phase) of the previous extraction step with fresh selective solvent system. Mass and component balances were maintained around each separate stage.

Tables I and II summarize the data from examples 1-3 using acetic acid and formic acid as the sole solvents. The extractions were carried out using three separate extraction stages. The component weight ratios in each stage are indicated in the Tables. The water present in the samples in the aqueous acid solutions and the shale oil is combined to provide the indicate water ratio.

The amount of nitrogen remaining in the raffinate shale oil is calculated for the shale oil in the raffinate corrected to zero water and acid content. The shale oil recovered in the raffinate excludes water and acid and is calculated as weight percentage of initial shale oil for each stage and is cumulative over the total extraction. This figure is normalized to 100 percent shale oil mass balance by dividing by the total percentage of shale oil recovered in both the selective solvent and raffinate phases. The nitrogen content of the extracted shale oil, i.e., the nitrogen content in the pregnant selective solvent phase, is derived from analysis of the extract solution following separation from the raffinate but without isolation of the shale oil from the selective solvent. The higher the value of this number the greater the efficiency of the separation, i.e., the greatest amount of nitrogen-containing compounds were removed with the least amount of shale oil removal in the extract. The oil dissolved in the solvent phase indicates the weight percent concentration of shale oil, whether nitrogen bearing or not, dissolved in the selective solvent for each extraction step.

The nitrogen contents of the phases were determined by modified Kjeldahl procedure. Karl Fisher titration was used to obtain water concentrations. Acetic acid and formic acid concentrations were derived from pH curves of sodium hydroxide titrations of the samples. The shale oil composition of each phase was obtained by subtracting the water and acid weight percent concentrations from 100 percent. The accuracy of the composition analysis ratios was correlated by mass balance determinations on the components.

EXAMPLES 4-9

These experiments were carried out using hydrochloric acid in combination with acetic acid or formic acid as the selective solvent for nitrogen-containing compounds.

The results of the experiments show that using hydrochloric acid with the organic acid can remove more nitrogen-containing compounds than when acetic or formic acid is used alone. The amount of low nitrogen-containing shale oil recovered is significantly increased over that which is expected for the organic acid extraction alone.

The experiments were carried out by weighing the shale oil and the selective solvent system into a separatory funnel. The mixture was thoroughly shaken to effect contact between the nitrogen-containing compounds present in the shale oil and the selective solvent of organic acid in combination with hydrochloric acid. The shale oil used contained 1.3 percent nitrogen. The acetic acid utilized was glacial acetic acid. The formic acid used in the experiments was concentrated formic acid which was 89.9 weight percent formic acid. The hydrochloric acid was a 37.7 weight percent concentrated hydrochloric acid. No additional water was added to the system.

Following through intermixing, the mixture was centrifuged to bring about phase separation and the selective solvent layer was subsequently collected. Fresh selective solvent was then added to the raffinate and the extraction repeated. The first and second stage extract solution and raffinates were analyzed for water, organic acid, hydrochloric acid, and nitrogen contents. The results of these extractions in the experiments are listed in the following Table III. The relative quantities used in each extraction are given in mole ratios. The amount of water is not shown but was inferred from the amount of hydrochloric acid and formic acid. An average molecular weight of 250 molecular weight units (M.W.U.) was assumed for the shale oil. The nitrogen concentrations for the raffinate and extract were calculated for the shale oils with residual selective solvents removed. The shale oil recovery figures were normalized to shale oil mass balances of 100 percent. The last column lists the solubility of the shale oil in the selective solvent phase.

TABLE I

ACETIC ACID EXTRACTION DATA

| Example No. | System Weight Ratios Oil:$H_2O$:Acetic | Oil:Solvent | Stage | N Content of Raffinate Oil Wt. % | Oil Recovered in Raffinate, Wt. % Each Stage | Cumulative | N Content of Extracted Oil Wt. % | Oil Dissolved in Solvent Phase Wt. % of Solution |
|---|---|---|---|---|---|---|---|---|
| 1 | 3.6:1:4.2 | 1:1.4 | 1 | 0.699 | 88.77 | — | 6.48 | 6.94 |
| | 5.1:1:8.2 | 1:1.8 | 2 | 0.464 | 91.63 | 77.90 | 3.37 | 6.08 |
| | 7.4:1:10 | 1:1.5 | 3 | 0.452 | 97.63 | 76.06 | 6.57 | 1.52 |

TABLE II

FORMIC ACID EXTRACTION DATA

| Example No. | System Weight Ratios Oil:$H_2O$:Formic | Oil:Solvent | Stage | N Content of Raffinate Oil Wt. % | Oil Recovered in Raffinate, Wt. % Each Stage | Cumulative | N Content of Extracted Oil Wt. % | Oil Dissolved in Solvent Phase Wt. % of Solution |
|---|---|---|---|---|---|---|---|---|
| 2 | 1.9:1:1.0 | 1:1.1 | 1 | 0.643 | 92.26 | — | 5.47 | 7.69 |
| | 1.8:1:1.2 | 1:1.2 | 2 | 0.387 | 94.47 | 87.16 | 4.91 | 4.49 |
| | 1.6:1:1.1 | 1:1.3 | 3 | 0.324 | 96.30 | 83.93 | 4.96 | 2.42 |
| 3 | 1.3:1.0:1 | 1:1.5 | 1 | 0.533 | 92.74 | — | 5.42 | 5.54 |
| | 1.7:1:1.2 | 1:1.3 | 2 | 0.516 | 95.50 | 88.57 | 1.59 | 3.14 |
| | 1.4:1:1.2 | 1:1.6 | 3 | 0.503 | 96.08 | 85.09 | 1.59 | 2.52 |

TABLE III

ORGANIC ACID-HCl EXTRACTIONS

| Experiment No. | Stage | Mole Ratios of Components Oil:Acid:HCl | Nitrogen in Raffinate Oil (Wt. %) | Nitrogen Removed (Wt. %) | Oil Recovered in Raffinate, Wt. % Each Stage | Cumulative | Nitrogen Content of Extracted Oil (Wt. %) | Oil Dissolved in Solvent Phase (Wt. % of Solution) |
|---|---|---|---|---|---|---|---|---|
| | | | | Acetic Acid-HCl | | | | |
| 4 | 1 | 5.9:17:1 | 0.256 | 80.3 | 70.98 | | 2.35 | 29.9 |
| | 2 | 6.3:20:1 | 0.112 | 91.4 | 90.29 | 64.09 | 1.42 | 11.19 |
| 5 | 1 | 3.5:15:1 | 0.151 | 88.4 | 70.02 | | 3.59 | 23.59 |
| | 2 | 2.8:16:1 | 0.109 | 91.6 | 88.64 | 62.06 | 0.53 | 7.83 |
| 6 | 1 | 2.0:8.1:1 | 0.173 | 86.7 | 72.89 | | 3.03 | 19.24 |
| | 2 | 1.8:9.3:1 | 0.089 | 93.2 | — | — | — | — |
| 7 | 1 | 0.59:1.3:1 | 0.432 | 66.8 | 84.40 | | 5.50 | 12.20 |
| | 2 | 0.49:1.6:1 | 0.393 | 69.8 | 93.83 | 79.20 | 0.98 | 4.10 |
| 8 | 1 | 0.39:0.36:1 | 0.430 | 66.9 | 90.57 | | 8.33 | 8.76 |
| | | | | Formic Acid-HCl | | | | |
| 9 | 1 | 0.59:1.7:1 | 0.370 | 71.5 | 88.84 | | 8.34 | 9.38 |
| | 2 | 0.51:1.3:1 | 0.320 | 75.4 | 94.97 | 84.37 | 1.16 | 3.82 |

What is claimed is:

1. A method for reducing the nitrogen content of shale oil by removing nitrogen-containing compounds from shale oil, comprising the steps of:

extracting the shale oil with an immiscible selective solvent system for the nitrogen-containing compounds comprising an organic acid and a mineral acid; and separating the immiscible selective solvent system containing nitrogen-containing compounds from the shale oil having a reduced nitrogen content.

2. A method as recited in claim 1 wherein the organic acid is selected from the group consisting of formic acid, acetic acid, trichloroacetic acid and mixtures thereof.

3. A method as recited in claim 1 wherein the mineral acid is selected from the group consisting of hydrochloric acid, nitric acid, nitrous acid, sulfuric acid, sulfurous acid, phosphoric acid and mixtures thereof.

4. A method as recited in claim 1 wherein the ratio of the organic acid to the mineral acid in the selective solvent is from about [1:5 to about 1:60] *60:1 to about 5:1.*

5. A method as recited in claim 1 wherein the selective solvent contains less than about fifty percent water.

6. A method as recited in claim 1 wherein the ratio of shale oil to selective solvent system comprises from about 0.20 to about 10 parts by weight shale oil to one part by weight selective solvent.

7. A method for reducing the nitrogen content of shale oil by removing nitrogen-containing compounds comprising the steps of:

extracting the shale oil at least once with an immiscible selective solvent system for nitrogen-containing compounds comprising an organic acid selected from the group consisting of formic acid, acetic acid, trichloroacetic acid and mixtures thereof and a mineral acid selected from the group consisting of hydrochloric acid, nitric acid, nitrous acid, sulfuric acid, sulfurous acid, phosphoric acid and mixtures thereof;

separating the selective solvent system containing the nitrogen-containing compounds from the shale oil having a reduced nitrogen content by phase separation; and recovering the selective solvent by separating the selective solvent from the nitrogen-containing compounds.

8. A method as recited in claim 7 wherein the recovered selective solvent is recycled for extracting nitrogen-containing compounds from shale oil containing nitrogen-containing compounds.

9. A method as recited in claim 7 wherein the extraction is conducted batchwise in at least three successive batch extractions.

10. A method as recited in claim 7 wherein the extraction is conducted by a continuous countercurrent extraction.

11. A method as recited in claim 10 wherein the recovered selective solvent system is recycled for the continuous countercurrent extraction.

12. A method as recited in claim 7 wherein the organic acid is selected from the group consisting of formic acid, acetic acid and mixtures thereof.

13. A method as recited in claim 7 wherein the mineral acid is selected from the group consisting of hydrochloric acid, phosphoric acid and mixtures thereof.

14. A method as recited in claim 7 wherein the ratio of organic acid to mineral acid is from [1:5 to 1:60] *60:1 to 5:1.*

15. A method as recited in claim 7 wherein the ratio of organic acid to mineral acid is from [1:15 to 1:40] *40:1 to 15:1.*

* * * * *